(12) United States Patent
Suga et al.

(10) Patent No.: US 11,937,526 B2
(45) Date of Patent: Mar. 26, 2024

(54) CONTROL DEVICE FOR WORK VEHICLE CONFIGURED TO TRAVEL AUTONOMOUSLY

(71) Applicant: KUBOTA CORPORATION, Osaka (JP)

(72) Inventors: Hiroki Suga, Sakai (JP); Shunsuke Miyashita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 407 days.

(21) Appl. No.: 17/297,526

(22) PCT Filed: Dec. 9, 2019

(86) PCT No.: PCT/JP2019/048044
§ 371 (c)(1),
(2) Date: May 27, 2021

(87) PCT Pub. No.: WO2020/129722
PCT Pub. Date: Jun. 25, 2020

(65) Prior Publication Data
US 2022/0007563 A1  Jan. 13, 2022

(30) Foreign Application Priority Data
Dec. 20, 2018 (JP) .................. 2018-238895

(51) Int. Cl.
*A01B 69/04* (2006.01)
*A01D 41/127* (2006.01)
*G05D 1/00* (2006.01)

(52) U.S. Cl.
CPC ........ *A01B 69/008* (2013.01); *A01D 41/1278* (2013.01); *G05D 1/0219* (2013.01); *G05D 1/0223* (2013.01); *G05D 1/0278* (2013.01)

(58) Field of Classification Search
CPC .. A01B 69/008; G05D 1/0219; G05D 1/0223; G05D 1/0278; G05D 2201/0201; B62D 6/002; B62D 15/025
See application file for complete search history.

(56) References Cited

FOREIGN PATENT DOCUMENTS

| JP | 06-300580 A | 10/1994 |
|----|-------------|---------|
| JP | 2573939 B2 | 1/1997 |

(Continued)

OTHER PUBLICATIONS

Translation of JP2018148858 to Miyamoto, (Year: 2018).*

(Continued)

*Primary Examiner* — Kenneth J Malkowski
(74) *Attorney, Agent, or Firm* — Keating & Bennett, LLP (57) ABSTRACT

A control device for a work vehicle configured or programmed to travel autonomously includes a vehicle position calculator to calculate a vehicle position, a travel direction calculator to calculate a travel direction that is a front-back direction of the vehicle body, a steering state detector to obtain data on a steering state, a vehicle position estimator to calculate an estimated vehicle position at which the work vehicle is to be present after performing predetermined travel from the vehicle position of the work vehicle, a deviation calculator to calculate a deviation of the work vehicle at the estimated vehicle position from the target travel path, a target steering amount calculator to calculate a target steering amount based on the deviation, and an autonomous travel controller to control steering based on the target steering amount.

9 Claims, 5 Drawing Sheets

(56) References Cited

FOREIGN PATENT DOCUMENTS

| JP | 2002-182741 A | 6/2002 |
| JP | 2010-126077 A | 6/2010 |
| JP | 5593606 B2 | 9/2014 |
| JP | 2016-146061 A | 8/2016 |
| JP | 2016-155491 A | 9/2016 |
| JP | 2018-148858 A | 9/2018 |

OTHER PUBLICATIONS

Translation of JP 2010126077 to Hideto, (Year: 2010).*
Translation of JPH06300580 to Kazuma, (Year: 1993).*
Official Communication issued in International Patent Application No. PCT/JP2019/048044, dated Jan. 28, 2020.
Official Communication issued in European Patent Application No. 19897852.0, dated Aug. 17, 2022.
Official Communication issued in corresponding Indian Patent Application No. 202147023210, dated Feb. 25, 2022.

* cited by examiner

CONTROL DEVICE FOR WORK VEHICLE CONFIGURED TO TRAVEL AUTONOMOUSLY

BACKGROUND OF THE INVENTION

1. Field of the Invention

The present invention relates to a control device for a work vehicle configured to travel autonomously along a target travel path.

2. Description of the Related Art

Japanese Unexamined Patent Application Publication, Tokukai, No. 2002-182741 discloses an agricultural work vehicle configured to travel autonomously along a preset target travel path. The agricultural work vehicle includes a steering mechanism controllable such that a vehicle position calculated with use of a GPS moves to a target point set on a target travel path. The steering mechanism is controlled to, in a case involving a larger lateral separation distance between the target travel path and a front portion of the vehicle body, further reduce the distance between the front portion and the target point.

Japanese Unexamined Patent Application Publication, Tokukai, No. 2016-155491 discloses a work vehicle configured to compute a target steering amount from a positional deviation and directional deviation from a target travel path so that a steering drive signal is outputted based on the target steering amount. Specifically, the target steering amount is computed from a first steering value and a second steering value, the first steering value being computed based on a lateral positional deviation, the second steering value being computed based on a value obtained by adjusting, with use of a weighting factor, a computed value derived from a directional deviation, the weighting factor being intended to reduce the computed value further in a case involving a larger positional deviation.

SUMMARY OF THE INVENTION

The respective work vehicles of Japanese Unexamined Patent Application Publication, Tokukai, No. 2002-182741 and Japanese Unexamined Patent Application Publication, Tokukai, No. 2016-155491 are each controlled to be steered based on a steering angle calculated at the time of detection of a positional deviation from a target travel path to overcome the positional deviation. Thus, even if the vehicle body is moving toward a target travel path at the time of detection of a positional deviation, the work vehicle will be steered at a large steering angle if the positional deviation is large at that time. This will cause the work vehicle to be steered by an excessively large amount and to thereby be unstable in autonomous travel. Further, if the vehicle body is moving away from a target travel path at the time of detection of a positional deviation, the work vehicle will be steered at a small steering angle if the positional deviation is small at that time. This will cause the work vehicle to be steered by an excessively small amount and to thereby be unstable in autonomous travel.

The above circumstances have led to a demand for a control device for a work vehicle configured or programmed to travel autonomously which control device has been improved to be capable of, if the vehicle body has moved off a target travel path during autonomous travel, causing the vehicle body to return to the target travel path appropriately.

According to a preferred embodiment of the present invention, a control device for a work vehicle to travel autonomously along a target travel path includes a vehicle position calculator to calculate a vehicle position of the work vehicle, a travel direction calculator to calculate a travel direction of the work vehicle, the travel direction being a front-back direction of a vehicle body of the work vehicle, a steering state detector to obtain data on a steering state of the work vehicle, a vehicle position estimator to calculate an estimated vehicle position at which the work vehicle is to be present after performing predetermined travel from the vehicle position of the work vehicle a deviation calculator to calculate a deviation of the work vehicle at the estimated vehicle position from the target travel pat, a target steering amount calculator to calculate a target steering amount based on the deviation; and an autonomous travel controller to control steering of the work vehicle based on the target steering amount.

With the above arrangement, the control device, in order for the vehicle body to be steered autonomously along a target travel path, calculates not the current vehicle position but an estimated vehicle position and controls the steering of the vehicle body based on the estimated vehicle position, the estimated vehicle position being a vehicle position at which the work vehicle will be present after performing predetermined travel from the current vehicle position. The control device predicts a vehicle position to serve as a basis for steering control and thus prevents the vehicle body from being steered by an excessively small amount or an excessively large amount for appropriate autonomous travel.

A work vehicle may be deviated from its target travel path in the form of a lateral deviation. A lateral deviation refers to a positional deviation of the work vehicle in the direction orthogonal to the direction of its target travel path. Reducing the lateral deviation allows the work vehicle to travel accurately along the target travel path while performing work. A preferred embodiment of the present invention thus further includes an estimated lateral deviation calculator to calculate an estimated lateral deviation, the estimated lateral deviation being a distance between the estimated vehicle position and the target travel path in a direction orthogonal to a direction of the target travel path, wherein the deviation calculator uses the estimated lateral deviation as the deviation of the work vehicle.

A work vehicle may be deviated from its target travel path in the form of a directional deviation. A directional deviation refers to an angular deviation of the travel direction of the work vehicle from the direction in which its target travel path extends. A work vehicle provided with a ground work device will be unable to perform appropriate ground work if the work vehicle has a large directional deviation. A preferred embodiment of the present invention thus further includes an estimated directional deviation calculator to calculate an estimated directional deviation, the estimated directional deviation being an angle defined by an estimated travel direction of the work vehicle at the estimated vehicle position and the target travel path, wherein the deviation calculator uses the estimated directional deviation as the deviation of the work vehicle. Controlling the steering to reduce the lateral deviation will basically reduce the directional deviation as well, but can increase the directional deviation. The most suitable measure is to appropriately combine steering control for reduction of the directional deviation with steering control for reduction of the lateral deviation.

The vehicle position estimator can calculate an estimated vehicle position (that is, a vehicle position at which the work vehicle will be present after performing predetermined travel) based on the current vehicle position specifically by, as an example, calculating as the estimated vehicle position a position at which the work vehicle will be present after traveling in the current travel direction at a certain speed for a predetermined time length. A preferred embodiment of the present invention for such a calculation includes a vehicle speed calculator to calculate a vehicle speed of the work vehicle, wherein the vehicle position estimator calculates, as the estimated vehicle position, a position at which the work vehicle is to be present after traveling at the vehicle speed for a predetermined time length in the travel direction calculated by the travel direction calculator. The predetermined time length may be selectable by a user or selected automatically according to a work state of the work vehicle.

The vehicle position estimator can calculate an estimated vehicle position (that is, a vehicle position at which the work vehicle will be present after performing predetermined travel) based on the current vehicle position specifically by, as another example, calculating as the estimated vehicle position a position at which the work vehicle will be present after traveling in the current steering state at a certain speed for a predetermined time length. A preferred embodiment of the present invention for such a calculation includes a vehicle speed calculator to calculate a vehicle speed of the work vehicle, wherein the vehicle position estimator calculates, as the estimated vehicle position, a position at which the work vehicle is to be present after traveling at the vehicle speed in the steering state for a predetermined time length. The predetermined time length may be selectable by a user or selected automatically according to a work state of the work vehicle.

The vehicle position estimator can calculate an estimated vehicle position (that is, a vehicle position at which the work vehicle will be present after performing predetermined travel) based on the current vehicle position specifically by, as another example, calculating as the estimated vehicle position a position spaced away from the current vehicle position over a predetermined distance on a line extending in the current travel direction. A preferred embodiment of the present invention for such a calculation is configured or programmed such that the vehicle position estimator calculates, as the estimated vehicle position, a position at which the work vehicle is to be present after traveling over a predetermined distance in the travel direction calculated by the travel direction calculator. The predetermined distance may be selectable by a user or selected automatically according to a work state of the work vehicle.

The vehicle position estimator can calculate an estimated vehicle position (that is, a vehicle position at which the work vehicle will be present after performing predetermined travel) based on the current vehicle position specifically by, as another example, calculating as the estimated vehicle position a position spaced away from the current vehicle position over a predetermined distance on an expected travel pathway based on the current steering state. A preferred embodiment of the present invention for such a calculation is configured or programmed such that the vehicle position estimator calculates, as the estimated vehicle position, a position at which the work vehicle is to be present after traveling over a predetermined distance in the steering state. The predetermined distance may be selectable by a user or selected automatically according to a work state of the work vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
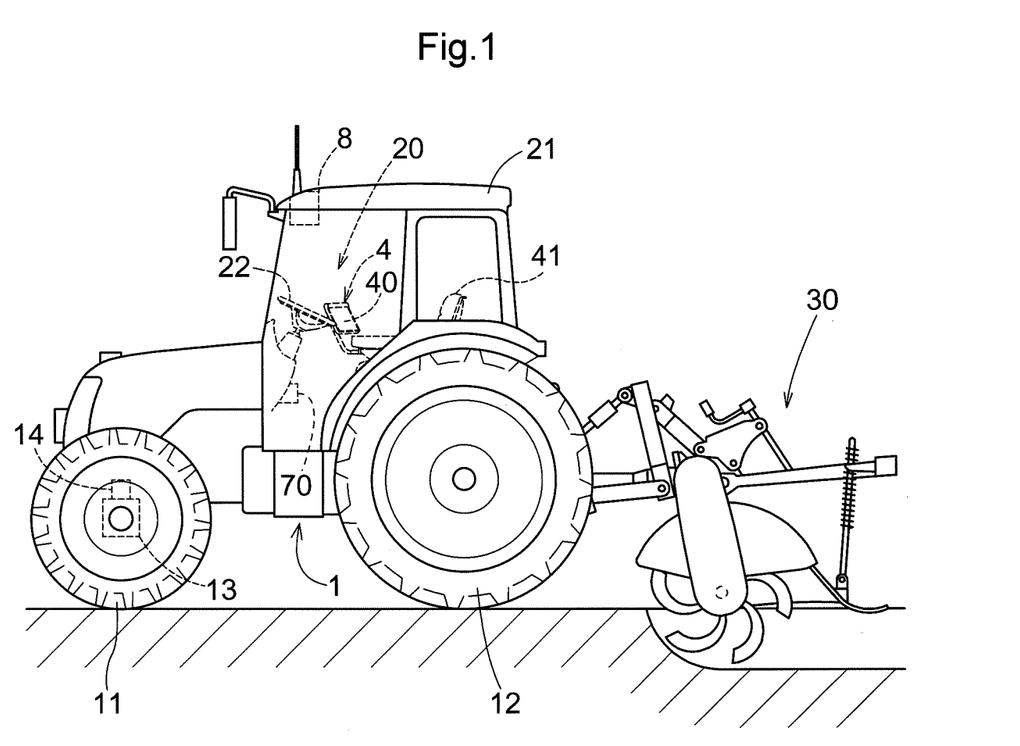
FIG. 1 is a side view of a tractor configured or programmed to travel autonomously along a target travel path.

With reference to drawings, the description below deals with example work vehicles each including a control device according to preferred embodiments of the present invention and configured or programmed to travel autonomously along a target travel path. FIG. 1 is a side view of a tractor as such a work vehicle. As illustrated in FIG. 1, the tractor includes front wheels 11, rear wheels 12, a vehicle body 1 supported by the front wheels 11 and the rear wheels 12, and a cab 20 at a central portion of the vehicle body 1. The tractor is provided with a rotary tiller device as a work device 30 attached to a back portion of the vehicle body 1 via a hydraulic lifting/lowering mechanism. The front wheels 11 function to steer the tractor: changing their steering angle changes the direction in which the tractor travels. The steering angle of the front wheels 11 is changed through operation of a steering mechanism 13. The steering mechanism 13 includes a steering motor 14 for autonomous travel. During manual travel, the front wheels 11 are controlled through operation of a steering wheel 22 provided in the cab 20. The tractor is provided with a positioning unit 8 to detect the position of the tractor. The cab 20 contains a general-purpose data processing terminal 4. The data processing terminal 4 is a tablet computer including a touch screen 40 that functions as a user operation device and a notification device, for example. The data processing terminal 4 receives various operations entered by the driver via the touch screen 40 and notifies the driver of various pieces of information.

Figure 2:
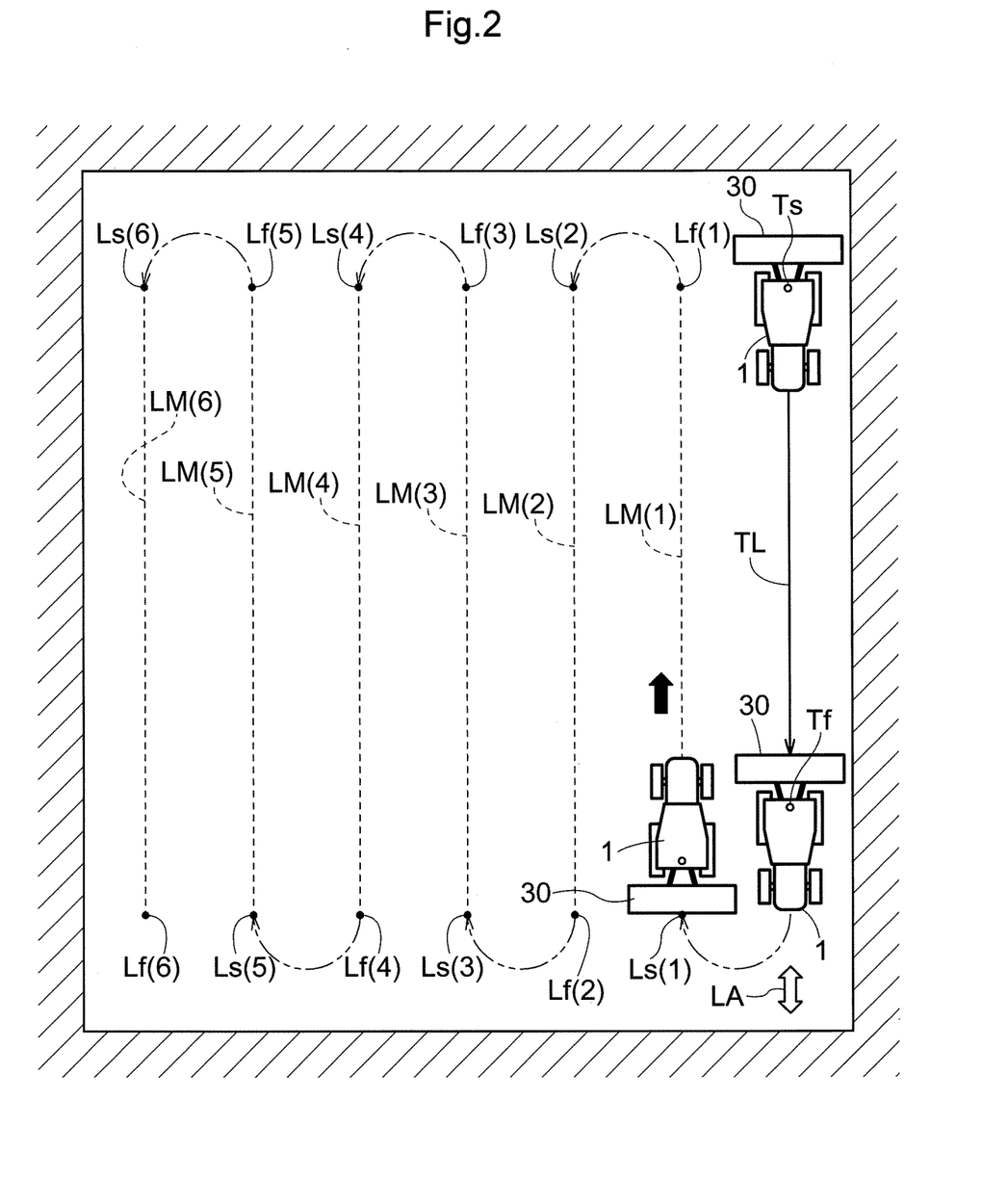
FIG. 2 is a diagram illustrating travel paths along which a tractor performs tillage work.

FIG. 2 schematically illustrates example tillage work performed by the tractor. The tillage work involves alternating between (i) straight travel during which the tractor travels along a linear work path while performing tillage work, and (ii) turn travel through which the tractor moves to a subsequent linear work path. The tractor is manually driven to travel along the first linear work path, which defines and functions as a teaching path TL. The tractor sets subsequent linear paths sequentially in such a pattern that the subsequent linear paths are next to one another and parallel or substantially parallel to the teaching path TL. The subsequent linear paths each define and function as a target travel path for autonomous travel, and are labeled as LM(1) to LM(6) in FIG. 2.

The description below deals with a travel process during the tillage work. To start tillage work, the driver manually drives the tractor to position the vehicle body 1 at a starting point position Ts close to a ridge of the agricultural field, and then operates a manual operation tool 90 (see FIG. 3;

hereinafter the same applies). The driver manually drives the tractor to cause the vehicle body 1 to travel from the starting point position Ts linearly along the ridge to a finishing point position Tf on the opposite side and close to the ridge, and then operates the manual operation tool 90 again. This allows a teaching path TL to be calculated from the position coordinates of the vehicle body 1 at the starting point position Ts and the position coordinates of the vehicle body 1 at the finishing point position Tf, the teaching path TL connecting the starting point position Ts with the finishing point position Tf. If the direction of the teaching path TL has been set in advance, at least a portion of the teaching travel may be performed through autonomous steering.

After the teaching path TL has been set, the driver causes the tractor to perform 180-degree turn travel to move to the starting point position Ls(1) of the first target travel path LM(1), which is adjacent to the teaching path TL.

After the turn travel ends, and the vehicle body 1 has become directed suitably for subsequent tillage work, operating the manual operation tool 90 causes the path setting section 54 to set a target travel path LM(1). When the path setting section 54 sets a target travel path LM(1), the control device checks whether the manual operation tool 90 was operated at a position suitable for tillage work. Such a suitable position is typically away from the position at which the tractor suspended tillage work over a distance of an integral multiple of the work width. The control device, in other words, checks whether the vehicle body 1 has a travel deviation within an acceptable range. If the travel deviation is within the acceptable range, the vehicle body 1 resumes performing autonomous travel along the target travel path LM(1) set as a target. If the travel deviation is outside the acceptable range, the vehicle body 1 does not resume autonomous travel: the driver manually steers the tractor so that the travel deviation of the vehicle body 1 will be within the acceptable range.

After starting autonomous travel, the tractor steers itself autonomously so that the vehicle body 1 remains along the target travel path LM(1). The target travel path LM(1) is a target travel path along which the vehicle body 1 performs work travel first after teaching travel. When the autonomous travel along the target travel path LM(1) has ended, the driver drives the tractor along a turn travel path. Then, the tractor sets a subsequent target travel path LM(2) that is adjacent to the previous target travel path LM(1) on the side of an unworked region and that extends from a starting point position Ls(2). Through a similar process, the tractor repeats setting a target travel path and performing work travel in the order of target travel paths LM(3), LM(4), LM(5), and LM(6) extending from respective starting point positions Ls(3), Ls(4), Ls(5), and Ls(6) with turn travel in-between.

Figure 3:
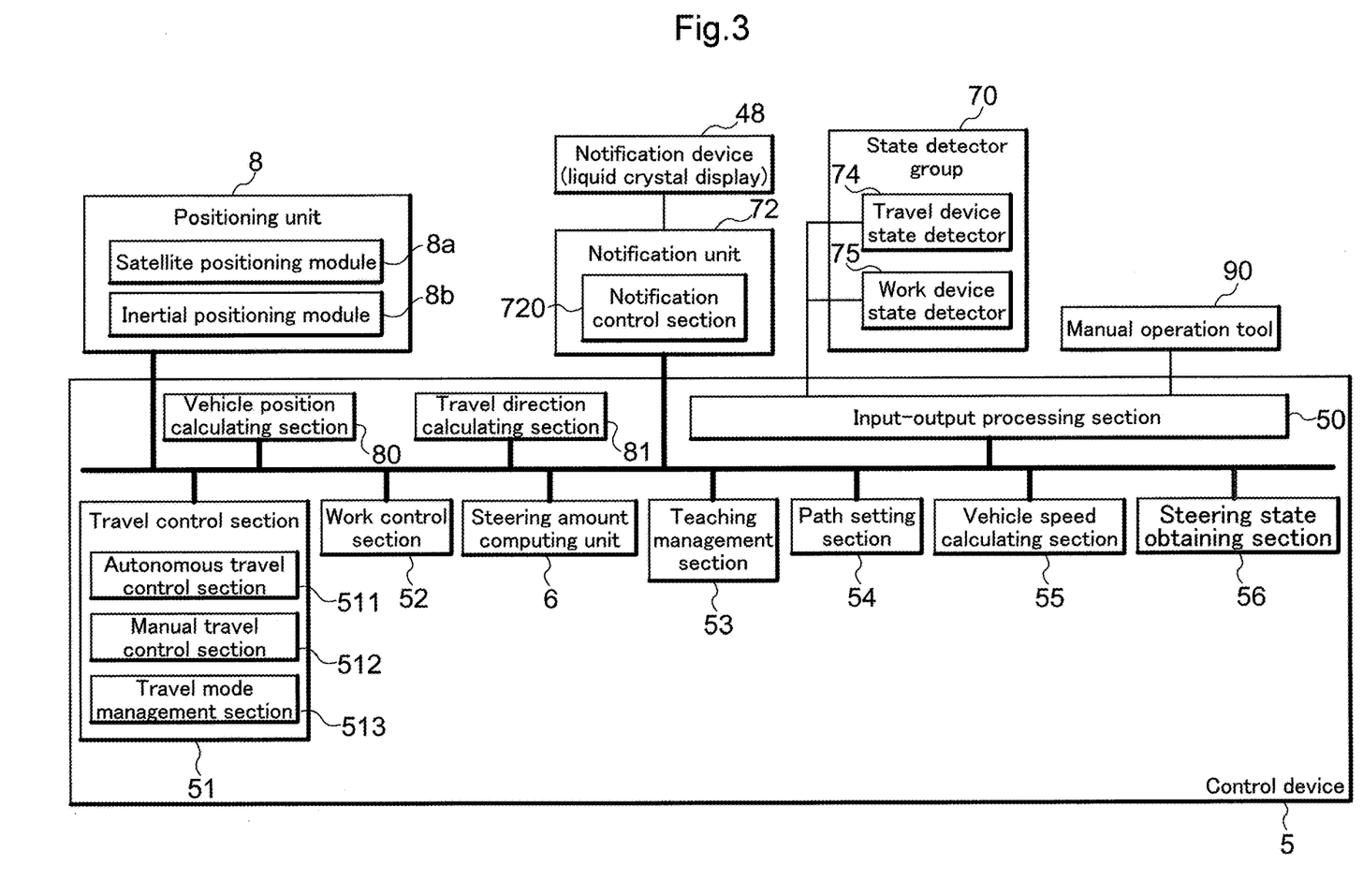
FIG. 3 is a functional block diagram illustrating the control system of a tractor.

With reference to FIG. 3, the description below deals with those functional sections of the control system of the tractor which are particularly relevant to preferred embodiments of the present invention.

The tractor includes a satellite positioning module 8a and an inertial positioning module 8b as included in the positioning unit 8. The satellite positioning module 8a has a satellite positioning function: it is capable of determining the position of the vehicle body 1 with use of a global positioning system (GPS), which is based on well-known art, as an example of a global navigation satellite system (GNSS) configured or programmed to receive a radio wave from a satellite and detect the position of the vehicle body 1. The present preferred embodiment uses a differential GPS for satellite positioning, but may alternatively use a different GPS such as a real-time kinematic GPS (RTK-GPS). The inertial positioning module 8b includes a triaxial gyro sensor and a triaxial acceleration sensor.

The inertial positioning module 8b includes, for example, a gyro sensor and an acceleration sensor, and is thus capable of detecting the angular velocity of a turn of the vehicle body 1 (see FIG. 1; hereinafter the same applies). The inertial positioning module 8b is capable of integrating the angular velocity to determine an angular change in the vehicle body direction. The inertial positioning module 8b is capable of measuring not only the angular velocity of a turn of the vehicle body 1, but also, for example, the angular velocity of the left-right inclination of the vehicle body 1 and the angular velocity of the front-back inclination of the vehicle body 1. The inertial positioning module 8b is present at a lower position behind a driver's seat 41 (see FIG. 1) in the cab 20 which position is a low position at the middle in the width direction of the vehicle body 1. The inertial positioning module 8b may alternatively be present at a position where the satellite positioning module 8a is present.

The control device 5 includes an input-output processing section 50 as an input-output interface. The input-output processing section 50 is connected to, for example, a state detector group 70 and various manual operation tools 90. The functional block diagram shows that the above-described positioning unit 8 is connected to the control device 5 over an in-vehicle LAN. The notification unit 72 is connected to a liquid crystal display 48 as a notification device. The liquid crystal display 48 is configured or programmed to display various information items based on a notification signal transmitted from a notification control section 720 incorporated in the notification unit 72. The notification unit 72 is connected to the control device 5 over the in-vehicle LAN.

The state detector group 70 includes various sensors, switches, and the like such as a travel device state detector 74 and a work device state detector 75. The travel device state detector 74 includes travel state detecting sensors such as a vehicle speed sensor, a steering angle sensor, an engine rotation speed sensor, a brake pedal detecting sensor, and a parking brake detecting sensor (not illustrated in the drawings). The work device state detector 75 includes sensors to detect the respective states of various mechanisms included in the work device 30 (see FIG. 1; hereinafter the same applies) such as a lifting/lowering mechanism.

The manual operation tools 90 are a general name for tools such as a lever, a switch, a button, and a volume control. The manual operation tools 90 are each operable by the driver for transmission of a control command to the control device 5.

The control device 5 includes a vehicle position calculating section 80, a travel direction calculating section 81, a travel control section 51, a work control section 52, a teaching management section 53, a path setting section 54, a vehicle speed calculating section 55, a steering state obtaining section 56, and a steering amount computing unit 6.

The vehicle position calculating section 80 calculates the map coordinates of the vehicle body 1 (that is, the vehicle position) based on satellite positioning data transmitted sequentially from the positioning unit 8. During the calculation, the vehicle position calculating section 80 converts the position calculated directly from satellite positioning data into a benchmark point on the vehicle body 1 (for example, the position of the vehicle body center or work center of the work device 30). The travel direction calculating section 81 processes data on vehicle positions (calculated by the vehicle position calculating section 80) over time to calculate the travel direction of the vehicle body 1, that is, its front-back direction.

The travel control section 51 transmits a steering control signal to the steering motor 14 (see FIG. 1) and signals such as a speed change control signal and a braking control signal to a travel device such as a transmission (not illustrated in the drawings). The travel control section 51 includes an autonomous travel control section 511, a manual travel control section 512, and a travel mode management section 513 in order for the tractor to selectively travel autonomously or be driven manually.

The tractor is set to an autonomous travel mode to drive itself autonomously or a manual travel mode to be driven manually. These travel modes are managed by the travel mode management section 513. When the tractor is in the autonomous travel mode, the autonomous travel control section 511 receives autonomous steering data (that is, data on a target steering amount) from the steering amount computing unit 6.

The work control section 52 controls lifting and lowering of the work device 30 and transmission of power to the work device 30 while the vehicle body 1 is traveling.

The teaching management section 53 calculates data on a teaching path TL (such as map coordinates) based on the teaching travel described above. The path setting section 54 sets a target travel path as a target of autonomous travel (for the present preferred embodiment, a path for straight, autonomously steered travel) through the procedure described above with reference to FIG. 2.

The vehicle speed calculating section 55 calculates the speed of the tractor based on a signal from a vehicle speed sensor or the amount of change of the vehicle position over time. The steering state obtaining section 56 obtains data on the steering state of the tractor (such as the steering angle) based on a signal from a steering sensor configured to detect the state of a steering device.

The steering amount computing unit 6 determines an estimated vehicle position, that is, a position at which the tractor will be present after performing predetermined travel from the current vehicle position. The steering amount calculating unit 6 then calculates a target steering amount based on a deviation(s) (namely, either or both of a positional deviation and a directional deviation) calculated based on the estimated vehicle position. The steering amount calculating unit 6 transmits data on the target steering amount to the autonomous travel control section 511.

Figure 4:
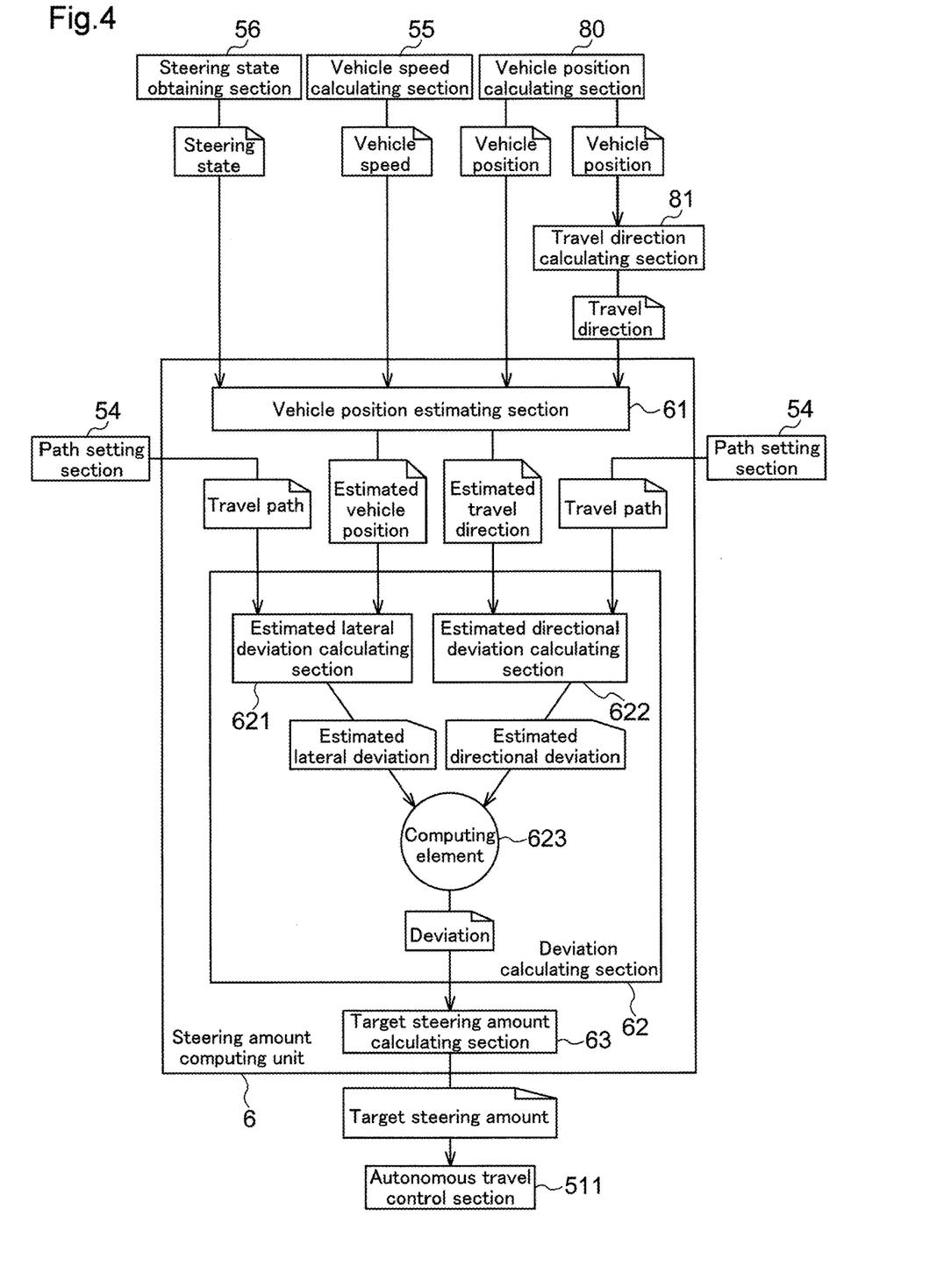
FIG. 4 is a functional block diagram illustrating functions of a steering amount computing unit and data flows.

The steering amount computing unit 6 includes a vehicle position estimating section 61, a deviation calculating section 62, and a target steering amount calculating section 63 as illustrated in FIG. 4. The vehicle position estimating section 61 calculates an estimated vehicle position, that is, a position at which the work vehicle will be present after performing predetermined travel from the current vehicle position calculated by the vehicle position calculating section 80. The deviation calculating section 62 calculates a deviation of the work vehicle at the estimated vehicle position, calculated by the vehicle position estimating section 61, from the target travel path. The target steering amount calculating section 63 calculates, based on the deviation (calculated by the deviation calculating section 62), a target steering amount intended to reduce the deviation.

Figure 5:
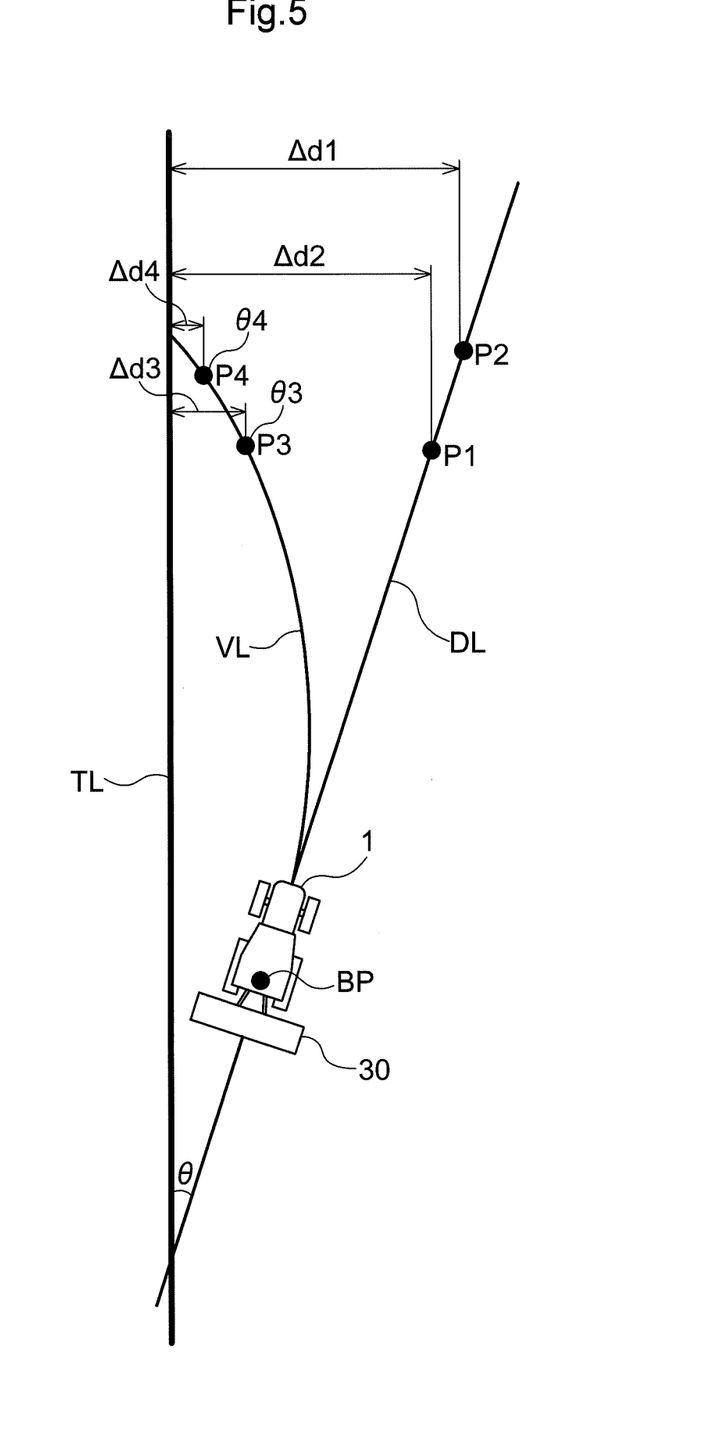
FIG. 5 is a schematic diagram for use in describing an estimated vehicle position, an estimated lateral deviation, and an estimated directional deviation.

The vehicle position estimating section 61 calculates an estimated vehicle position by, for example, any of the methods described below with reference to FIG. 5. FIG. 5 shows that the vehicle body 1 is currently deviated to the right in the drawing from a target travel path (indicated as "TL" in FIG. 5) and that the travel direction line of the vehicle body 1 (indicated as "DL" in FIG. 5), that is, its front-back direction, is inclined relative to the target travel path.

(1) Calculate, as an estimated vehicle position, the position (indicated as "P1" in FIG. 5) at which a benchmark point (indicated as "BP" in FIG. 5) on the vehicle body 1 will be present after being moved over a predetermined distance along the travel direction line.

(2) Calculate, as an estimated vehicle position, the position (indicated as "P2" in FIG. 5) at which the benchmark point on the vehicle body 1 will be present after being moved for a predetermined time length at the current vehicle speed along the travel direction line.

(3) Calculate, as an estimated vehicle position, the position (indicated as "P3" in FIG. 5) at which the benchmark point on the vehicle body 1 will be present after being moved over a predetermined distance in the travel direction along an expected travel pathway (shown with a dotted line and indicated as "VL" in FIG. 5) based on the current steering information (steering angle), that is, after the work vehicle has traveled over a predetermined distance.

(4) Calculate, as an estimated vehicle position, the position (indicated as "P4" in FIG. 5) at which the benchmark point on the vehicle body 1 will be present after being moved for a predetermined time length at the current vehicle speed along an expected travel pathway based on the current steering information (steering angle).

The vehicle position estimating section 61 calculates an estimated vehicle position by at least one of the estimated vehicle position calculating methods described above and any methods similar thereto. The vehicle position estimating section 61 may use a plurality of estimated vehicle position calculating methods so that one of the estimated vehicle positions calculated is selected by a person or automatically according to the work state of the tractor. Further, the above predetermined distance and predetermined time length for use in the calculation by the vehicle position estimating section 61 may be selected by a person, automatically without a condition, or automatically according to the work state of the tractor. The vehicle position estimating section 61 also calculates an estimated travel direction, that is, the travel direction of the vehicle body 1 at the estimated vehicle position.

The deviation calculating section 62 calculates (i) an estimated lateral deviation, that is, the lateral deviation of the vehicle body 1 at the estimated vehicle position calculated, and (ii) an estimated directional deviation, that is, the directional deviation of the vehicle body 1 at the estimated vehicle position. An estimated lateral deviation refers to the distance in the direction orthogonal to the direction of the target travel path between the benchmark point on the vehicle body 1 at the estimated vehicle position and a target travel path. An estimated directional deviation refers to the angle defined by the estimated travel direction and the target travel path.

The deviation calculating section 62 for the present preferred embodiment includes an estimated lateral deviation calculating section 621, an estimated directional deviation calculating section 622, and a computing element 623. The estimated lateral deviation calculating section 621 calculates an estimated lateral deviation. FIG. 5 shows $\Delta d1$ to $\Delta d4$ to each indicate an estimated lateral deviation calculated. The estimated directional deviation calculating section 622 calculates an estimated directional deviation. For methods (1) and (2) above, the estimated travel direction is the same as the current travel direction of the vehicle body 1 (indicated as "θ" in FIG. 5). For methods (3) and (4) above, the estimated travel direction is calculated based on the travel direction of the vehicle body 1 at the estimated vehicle position on the expected travel pathway. FIG. 5 shows θ3 and θ4 to each indicate an estimated travel direction.

The computing element 623 receives, as input parameters, data on an estimated lateral deviation calculated by the estimated lateral deviation calculating section 621 and data on an estimated directional deviation calculated by the estimated directional deviation calculating section 622. The computing element 623 then, for example, weights the input parameters and outputs the resulting deviation data. The deviation calculating section 62 may alternatively include only either the estimated lateral deviation calculating section 621 or the estimated directional deviation calculating section 622. Further alternatively, the estimated lateral deviation calculating section 621 and the estimated directional deviation calculating section 622 may be used selectively.

The deviation data outputted by the deviation calculating section 62 is received by the target steering amount calculating section 63 as an input parameter. The target steering amount calculating section 63 may alternatively receive, instead of the deviation data outputted by the deviation calculating section 62, the data on an estimated lateral deviation and the data on an estimated directional deviation as input parameters. The target steering amount calculating section 63 may be in the form of, for example, a PI controller or PID controller.

Alternative Preferred Embodiments (1) The preferred embodiments described above use front wheels 11 to steer a vehicle body and a steering motor 14 as a steering device. If a preferred embodiment of the present invention instead uses crawler-type travel devices as a steering system, the autonomous travel control section 511 will control devices configured or programmed to change the respective speeds of the left and right crawlers.

(2) The preferred embodiments described above involve linear target travel paths. The target travel paths may alternatively each extend in a curve with a large radius of curvature.

(3) The preferred embodiments described above is configured or programmed such that the driver performs teaching travel first and that the path setting section 54 then sets target travel paths based on a teaching path calculated as a result of the teaching travel. A preferred embodiment may alternatively be configured or programmed such that the driver does not perform teaching travel and that the path setting section 54 generates and sets all target travel paths automatically based on, for example, the shape of the agricultural field.

(4) The functional sections shown in FIGS. 3 and 4 are grouped mainly for the purpose of description. The functional sections may alternatively each be integral with another functional section(s) or be divided further into a plurality of different functional sections. Further, at least a portion of the functional sections included in the control device 5 may alternatively be included in the data processing terminal 4.

(5) The control device 5 is not necessarily provided for the vehicle body 1; part or all of the control device 5 may alternatively be present outside the vehicle body 1 in such a state as to be capable of data communication with the vehicle body 1. A preferred embodiment described above may alternatively be configured or programmed, for instance, such that the control device 5 is mounted on a communication terminal or management computer and that the communication terminal or management computer transmits and receives necessary information to and from the vehicle body 1.

(6) The control device 5 may have any configuration as long as it allows functions and processes similar to those described above to be performed. The functions and processes may be achieved by hardware or software. If the functions and processes are to be achieved by software, the programs are stored in a storage section and executed by a processor such as a CPU or an ECU included in, for example, the control device 5.

(7) The preferred embodiments described above of the present invention are tractors each provided with a control device according to a preferred embodiment of the present invention. The control device may alternatively be mounted on other agricultural field work vehicles such as combines and rice transplanters for preferable performance of autonomous travel.

Preferred embodiments of the present invention are applicable to any agricultural field work vehicle configured or programmed to travel autonomously along a target travel path in an agricultural field.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device for a work vehicle configured to travel autonomously along a target travel path, the control device comprising:
a processor configured or programmed to define and function as:
a vehicle position calculator to calculate a vehicle position of the work vehicle;
a travel direction calculator to calculate a travel direction of the work vehicle, the travel direction being a front-back direction of a vehicle body of the work vehicle;
a steering state detector to obtain data on a steering state of the work vehicle;
a vehicle position estimator to calculate an estimated vehicle position at which the work vehicle is to be present after performing predetermined travel from the vehicle position of the work vehicle;
a deviation calculator to calculate a deviation of the work vehicle at the estimated vehicle position from the target travel path;
an estimated lateral deviation calculator to calculate an estimated lateral deviation, the estimated lateral deviation being a distance between the estimated vehicle position and the target travel path in a direction perpendicular or substantially perpendicular to a direction of the target travel path;
an estimated directional deviation calculator to calculate an estimated directional deviation, the estimated directional deviation being an angle defined by an estimated travel direction of the work vehicle at the estimated vehicle position and the target travel path;
a target steering amount calculator to calculate a target steering amount based on the estimated lateral deviation and the estimated directional deviation; and
an autonomous travel controller to control steering of the work vehicle based on the target steering amount.

2. The control device according to claim 1, wherein
the processor is configured or programmed to define and functions as a vehicle speed calculator to calculate a vehicle speed of the work vehicle; and
the vehicle position estimator calculates, as the estimated vehicle position, a position at which the work vehicle is to be present after traveling at the vehicle speed for a predetermined time length in the travel direction calculated by the travel direction calculator.

3. The control device according to claim 1, wherein
the processor is configured or programmed to define and function as a vehicle speed calculator to calculate a vehicle speed of the work vehicle; and
the vehicle position estimator calculates, as the estimated vehicle position, a position at which the work vehicle is to be present after traveling at the vehicle speed in the steering state for a predetermined time length.

4. The control device according to claim 2, wherein the predetermined time length is selectable by a user.

5. The control device according to claim 2, wherein the predetermined time length is selected automatically according to a work state of the work vehicle.

6. The control device according to claim 1, wherein the vehicle position estimator calculates, as the estimated vehicle position, a position at which the work vehicle is to be present after traveling over a predetermined distance in the travel direction calculated by the travel direction calculator.

7. The control device according to claim 1, wherein the vehicle position estimator calculates, as the estimated vehicle position, a position at which the work vehicle is to be present after traveling over a predetermined distance in the steering state.

8. The control device according to claim 6, wherein the predetermined distance is selectable by a user.

9. The control device according to claim 6, wherein the predetermined distance is selected automatically according to a work state of the work vehicle.

* * * * *